April 26, 1949.    W. W. LASKER, JR    2,468,335
PRESSURE BOOSTER APPARATUS FOR
PIN SENSING MECHANISMS
Filed July 13, 1945    4 Sheets-Sheet 1

INVENTOR
W.W. LASKER JR.
BY *[signature]*
ATTORNEY

INVENTOR
W. W. LASKER JR.
BY John L. Sterling
ATTORNEY

April 26, 1949.     W. W. LASKER, JR     2,468,335
PRESSURE BOOSTER APPARATUS FOR
PIN SENSING MECHANISMS
Filed July 13, 1945                    4 Sheets-Sheet 3

INVENTOR
W.W. LASKER JR.
BY
ATTORNEY

April 26, 1949.  W. W. LASKER, JR  2,468,335
PRESSURE BOOSTER APPARATUS FOR
PIN SENSING MECHANISMS Filed July 13, 1945  4 Sheets-Sheet 4

INVENTOR
W. W. LASKER JR.
BY *John L. Sterling*
ATTORNEY

Patented Apr. 26, 1949

2,468,335

UNITED STATES PATENT OFFICE 2,468,335

PRESSURE BOOSTER APPARATUS FOR PIN SENSING MECHANISMS

William W. Lasker, Jr., Brooklyn, N. Y., assignor to Remington Rand Inc., Buffalo, N. Y., a corporation of Delaware Application July 13, 1945, Serial No. 604,865

5 Claims. (Cl. 235—61.11)

This invention relates to machines which operate under the control of punched cards, and has particular reference to the mechanical analyzing means utilized by such machines for determining the relative location of perforations in such cards.

The present embodiment of the invention as disclosed herein is an improvement in the sensing pin box of a well known Powers type sorter, as shown and described in Patent 1,476,171, issued to W. W. Lasker, December 4, 1923. In its operation, as therein described, cards are fed consecutively from a magazine to one of a plurality of compartments, the selection of the appropriate compartment being effected by momentarily retaining each card within the field of reciprocation of a row of individually suspended yieldable sensing pins, the continued movement of any such pin or pins unobstructed by the card being utilized to open a gate to the corresponding card compartment.

The improvements herein disclosed, briefly stated, comprise auxiliary means for increasing the spring tension imparted to each of said individual sensing pins without, in so doing, causing harmful or injurious effects by the pins to the imperforated surface of the card.

The principal object of the invention is to permit detection of card perforation patterns obstructed by the presence of foreign elements.

An additional object is to remove an obstructing element from a card perforation concurrently with the detection of said obstructed perforation.

Further objects and advantages will be apparent from the following description with reference to the drawings, wherein Fig. 1 is a front view of a sensing pin box at the start of the sensing stroke;

Figure 1:
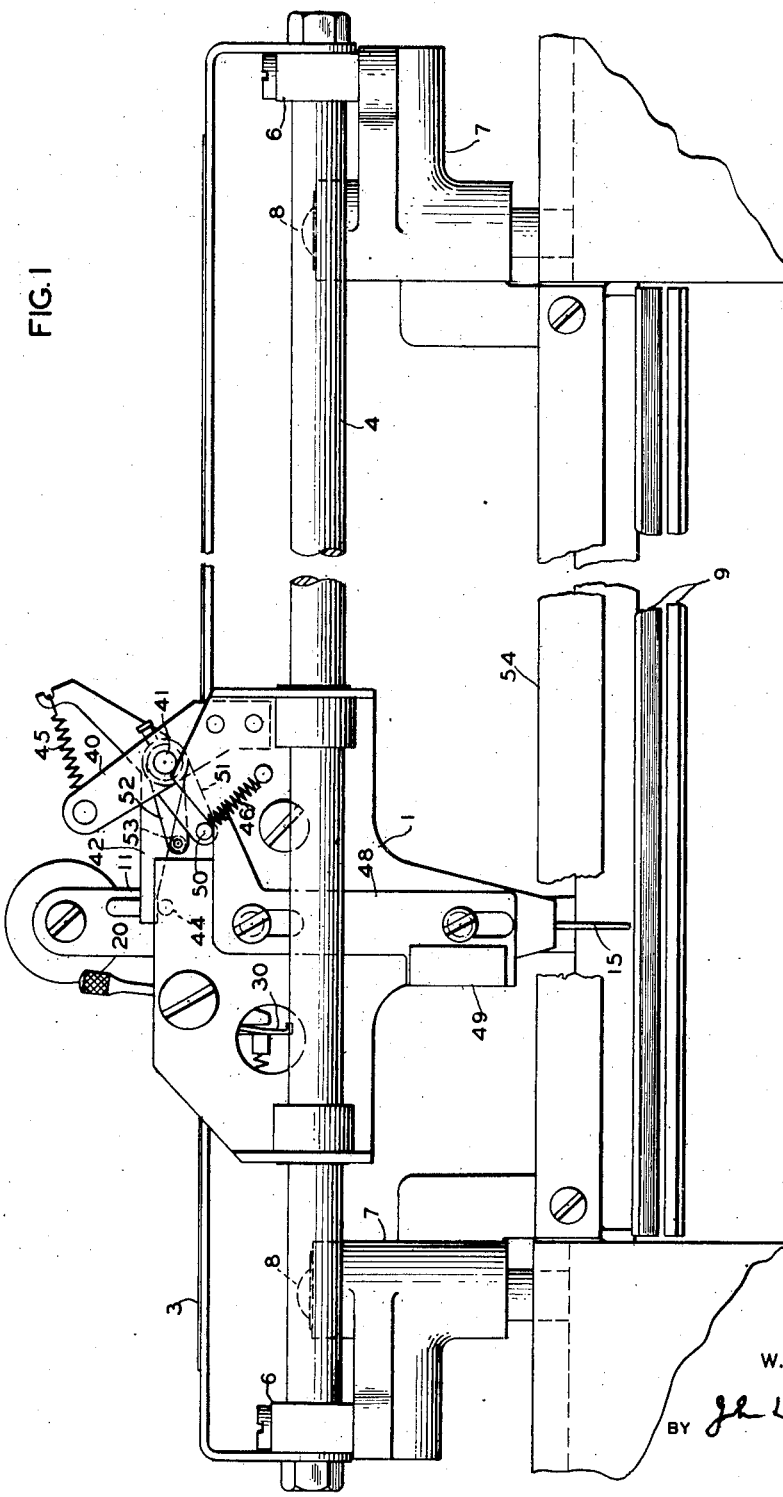
Figure 2:
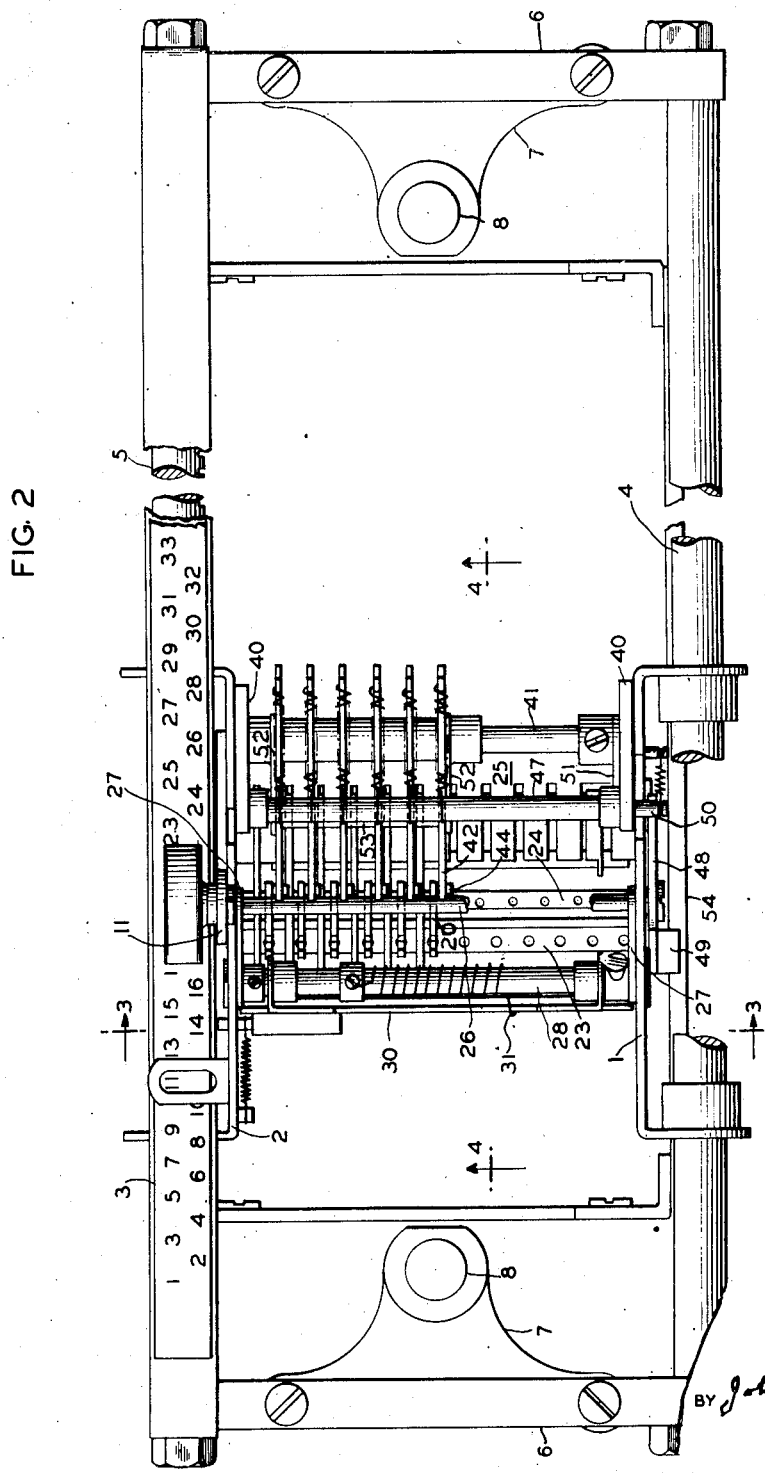
Fig. 2 is a plan view of the sensing pin box.

As more fully described in the aforesaid Patent 1,476,171, and as seen in the drawings included herewith, a row of sensing pins 15 is suspended between the two end plates 1 and 2, respectively of a sensing pin box slidably mounted, as best seen in Figs. 1 and 2, on a pair of guide rods 4 and 5, said guide rods being supported by bars 6 secured to sleeves 7 mounted on stationary posts 8. Reciprocable motion imparted to said sleeves by means, not shown, causes a like motion of the pin box to and from a card chamber formed by the usual pair of suitably spaced perforated plates 9 disposed therebelow. Manual positioning of the pin box in alignment with the desired card column as read from a column indicator 3, is effected by a locking slide 11 releasably engageable with notches formed in the rear guide rod 5.

Figure 4:
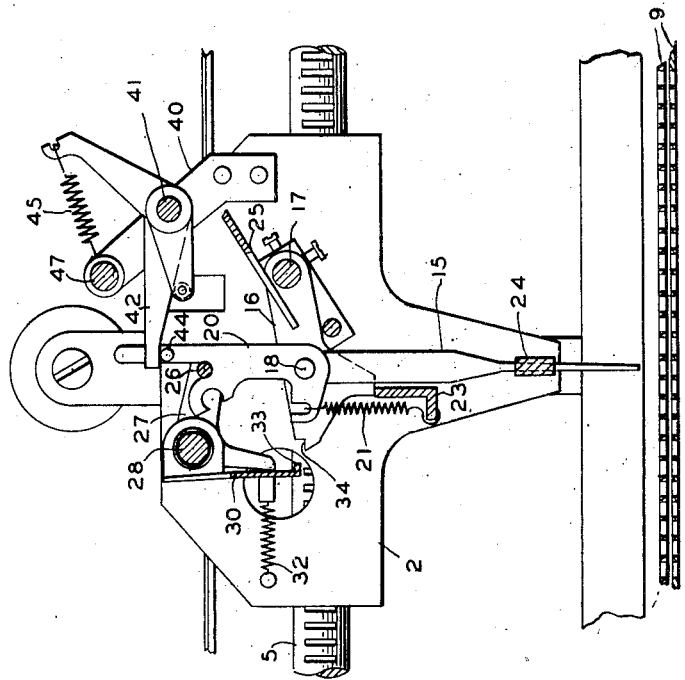
Fig. 4 is a sectional view of the sensing pin box along line 4—4 of Fig. 2.

As best seen in Fig. 4, each sensing pin 15 is pivotally suspended at 18 from a supporting lever 16 loosely mounted on a shaft 17 extending between the end plates 1 and 2. In the present instance six of said pins are provided, the disclosed embodiment having been designed primarily for sorting the particular form of card hereinafter described. A bell-crank lever 20, also pivoted at 18, has a vertical arm formed with a recessed shoulder for accommodating a latch actuating bail 26 supported by the horizontal arms of a pair of bell-cranks 27 fast on a rock shaft 28. Loosely mounted on said rock shaft (see also Fig. 3) is a latch plate 30 provided with a lip 33 for engagement with a notched recess 34 in the free end of the pin supporting levers 16. A spiral spring 31 acts to urge the latch plate against the free vertical arm of ball-cranks 27, a relatively lighter expansion spring 32 attached to the latch plate acting to retain the parts in an ineffective latching position as shown in Fig. 4. Springs 21 secured to the horizontal arm of bell-crank levers 20 yieldably retain each sensing pin 15 in a normal lowered position relative to the pin box wherein the supporting levers 16 abut against a stop bar 23 extending between the two end plates 1 and 2. A perforated bar 24, also extending between the end plates, guides the shank of each pin in alignment with the index positions of a card column, a comb plate 25 serving to space the pin supporting levers 16 accordingly.

In operation, as more fully described in the aforesaid patent, when the sensing pin box is lowered to sense a card column, all those sensing pins 15 which are brought to bear on an imperforated surface of a card held in the card chamber are stopped by the card from further downward movement resulting in their displacement upwards relative to the pin box which continues to descend. At the same time, all those sensing pins which are aligned with card perforations retain their normal position relative to the pin box as it continues to descend. During such continued movement of the pin box the relative upward displacement of all pins so blocked by the card results in rocking the latch plate 30 through bail 26 into engagement with only levers 16 of those pins which are not blocked by the card, giving said unresisted pins a positive propelling force for actuating certain controlling elements of the machine.

From the foregoing it will be noted that the pressure brought to bear against the card by the pins 15 has been heretofore determined principally by the strength of springs 21. Since a card normally undergoes several sorting operations, it is essential that the tension derived from said springs and imparted by the pins be insufficient to injure the imperforated surface of the card after repeated operations thereupon. For this reason it becomes apparent a pressure so necessarily light could be overcome in a single sorting operation by an obstructing element, providing substantially less resistance to the pin movement than does the surface of the usual punched card.

Figure 6:
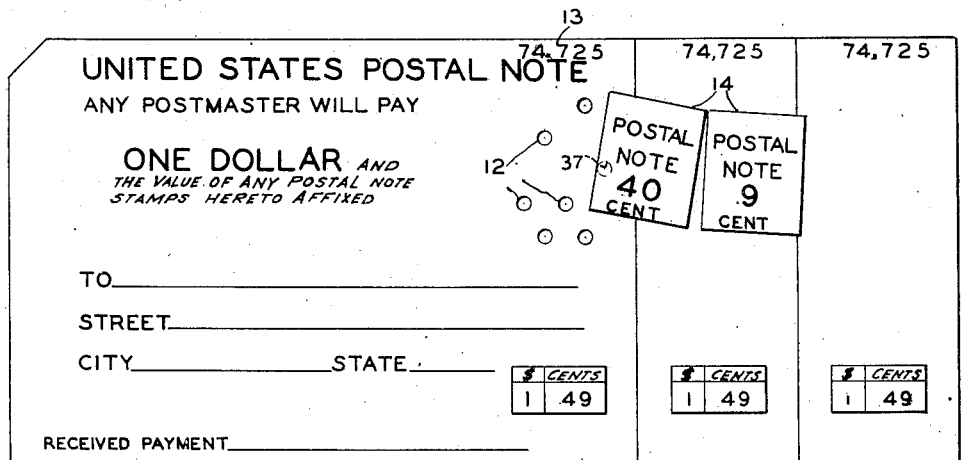
Fig. 6 is a view of a punched card in the form of a United States postal note.

As shown in Fig. 6, a card 10 may be prepared in the form of a United States postal note in which certain designative data pertaining thereto is indicated by a perforation pattern 12 prepunched therein. In accordance with the practice now adopted such notes are prepared in groups of varying dollar denominational value with the serial number thereof 13 pre-punched in an appropriate punch field of the card. In the present instance the card shown is of the well known Powers ninety column type with the serial number punched in the corresponding Powers numeric code in the upper zone columns thereof. In issuing such notes, odd cents values desired in excess of the dollar denominational value are indicated by postal note stamps 14 affixed to a stub of the note by the issuing postmaster. Since the perforation pattern 12 is punched prior to the application of said stamps, the possibility is always present that one or more of the perforations, such as 37, will be inadvertently covered by a stamp as shown in Fig. 6. In such cases, sorting of the card by means heretofore employed will fail to detect the obstructed perforation, the stamp 14 providing enough resistance to overcome the relatively light tension, as aforesaid, on the sensing pin brought to bear thereupon. The novel means hereinbelow described provides auxiliary initial tension on each sensing pin sufficient to cause penetration of such obstructing elements, together with mechanism for removing said auxiliary tension from all pins before it can result in material injury to the imperforated surface of the card.

Figure 3:
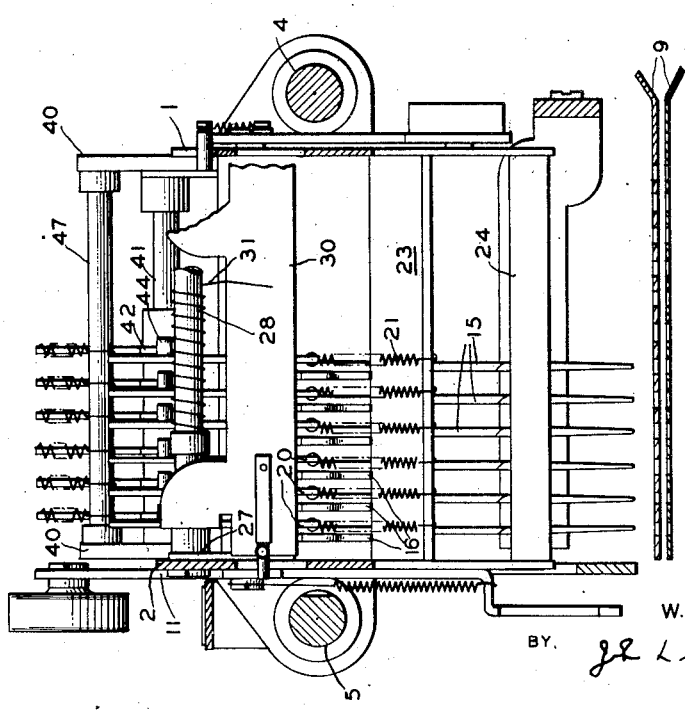
Fig. 3 is a view of the same from the left taken along line 3—3 of Fig. 2.

As best seen in Figs. 2, 3 and 4 the novel means for effecting the aforesaid result include a rock shaft 41 journaled in supporting arms 40 secured to each of the end plates 1 and 2. Loosely mounted on said rock shaft are a plurality of bellcranks 42, the horizontal arm of each of said bell-cranks bearing on extrusions 44 formed in the vertical arm of each of the aforementioned levers 20. A spring 45 connecting the other arm of said bell-cranks with a shaft 47 fixed in said arms 40 exerts a counter-clockwise pull on the bell-cranks thereby increasing the spring tension through levers 20 on the sensing pins 15. Springs 45 are of such a strength when in their normal contracted condition as shown in Fig. 4, as will cause penetration by the sensing pins of stamps 14 and the like when the pin box descends, but not of sufficient strength to cause scoring of the card 10 in such contracted condition.

Figure 5:
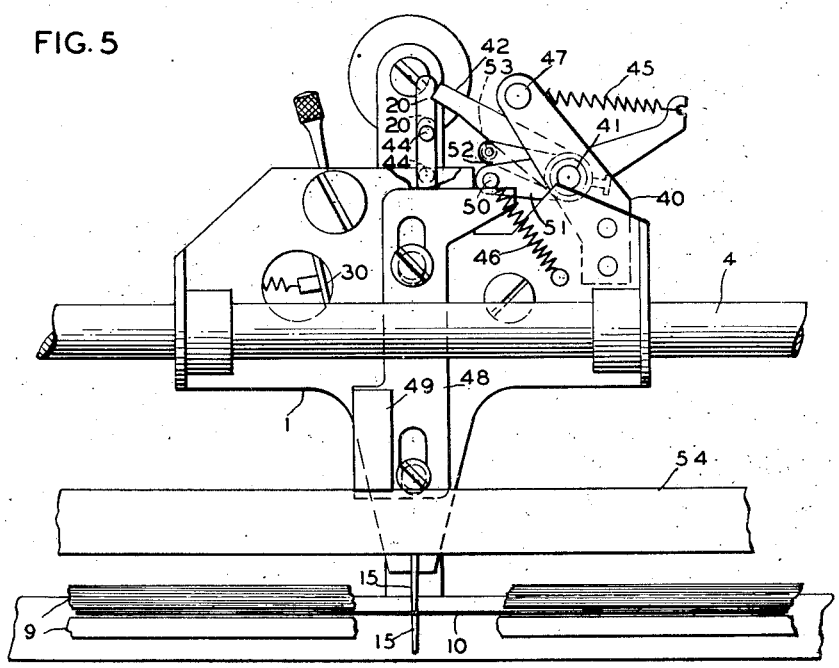
Fig. 5 is a front view of the sensing pin box at the completion of the sensing stroke.

Since the upward relative displacement of all pins bearing on a card, as heretofore described, acts to stretch the springs 45, it is apparent that the pressure of the pins against the card becomes increasingly greater as the pin box continues to descend. A spring 45 sufficiently strong when in contracted condition as shown in Fig. 4, to cause penetration by the pins of obstructing elements such as stamps or the like, can cause material injury to a card when in an expanded condition as seen in Fig. 5. For this reason, tension release mechanism is provided which, as best seen in Figs. 1, 2, and 5, includes a release slide 48 mounted on screws projecting from the end plate 1 and having an arm underlying a pin 50 carried by a rock arm 51 adjustably collared to the rock shaft 41. An additional pair of arms 52 fast on the rock shaft 41 supports a release bail 53 underlying the horizontal arms of bell-cranks 42. During the sensing stroke of the pin box a stop bar 54 firmly secured to the machine and disposed in path of an extruding block 49 secured to the release slide 48, engages said block to effect upward displacement of the slide relative to the descending pin box. The upward relative movement of the slide rocks the arm 51 clockwise which, through the bail 53, raises the bell-cranks 42 above the extrusions 44 on levers 20 in this manner removing the added tension derived from auxiliary springs 45 from the sensing pins 15. Timing of the tension release can be adjusted by increasing or decreasing the lost motion in the operation of rock shaft 41 as determined by the adjustable positioning of rock arm 51 on the shaft. Preferably said timing would be so adjusted as to release the auxiliary tension from the pins the moment the points of any pin aligned with a perforation is carried completely through the card and starts to enter the lower plate 9 of the card chamber. By so adjusting the rock arm 51, the added tension of springs 45 will remain on the sensing pins long enough to cause penetration also of any such perforation obstructing elements which may be disposed on the under side of a card. A spring 45 (Figs. 1 and 5) connecting pin 50 with end plate 1 acts to return the release slide 48 and bail 53 to their normal positions as seen in Fig. 1.

It will be noted that the novel mechanism herein described acts not only to improve the sensing operation of sorters so as to detect obstructed perforation patterns, but also acts to remove concurrently that portion of the perforation obstructing element which covers the pattern. For this reason, many errors and inaccuracies are avoided which would otherwise result from running such cards through other card operable machines not provided with the improvements herein disclosed.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new and desire to secure by Letters Patent is:

1. In a machine of the class described, reciprocable card sensing mechanism, a plurality of sensing pins each yieldably displaceable by the imperforate surface of the card being sensed, auxiliary tensioning means associated with each of said pins and effective during an initial partial displacement of said pins for resisting said displacement, and tension release means engageable with said auxiliary means and responsive to a partial movement of said reciprocable mechanism for disassociating said auxiliary means from said pins prior to the maximum displacement of said pins.

2. In a machine of the class described, having a record analyzing unit, including a plurality of yieldably tensioned sensing pins adapted to selectively bear against the surface of a record card being sensed, the continued movement of said pins finding perforations in said record card being adapted to operate machine members, auxiliary yieldable means cooperating with each pin for increasing the tension on said sensing pins, and release means shiftably mounted on said unit and actuable at a predetermined point in the continued movement of said pins for disabling said auxiliary means.

3. In a machine of the class described having a reciprocable analyzing unit, a plurality of sensing pins yieldably mounted therein and displaceable by the imperforated surface of a card being analyzed, auxiliary yieldably mounted members cooperating with said sensing pins increasingly tensionable by the relative displacement within said unit of said pins displaced by said card, a release member adapted to move said auxiliary yieldably mounted members out of operative relation with all of said pins, and an actuating member shiftably mounted on said unit and adapted to actuate said release member after the tension on said yieldably mounted members has increased to a predetermined amount.

4. In a machine of the class described having an analyzing unit which includes a reciprocable structure supporting a plurality of yieldably mounted sensing pins adapted to be displaced within said structure by the resistance supplied by the imperforated surface of a card being analyzed, a plurality of auxiliary springs normally relatively contracted and adapted to provide additional initial resistance to the displacement of each of said pins by said card, and release mechanism actuable by the movement of said structure for removing said additional resistance provided by said springs before the increasing resistance caused by the expansion thereof equals the said resistance supplied by the imperforated surface of the card.

5. In a card analyzing device of the class described having a supporting structure for suspending a plurality of sensing pins individually displaceable by the card to be analyzed, a yieldably mounted lever associated with each of said pins, a second lever pivoted to said pins and engageable by said yieldably mounted lever so as to transmit the yieldable force thereof to said pin, a bail adapted to rock said yieldably mounted levers out of engagement with said second named lever, a release slide mounted on said structure for movement relative to said structure, means responsive to the movement of said slide relative to said structure for rocking said bail into operative position, and a slide actuating member detached from said structure and engageable with said slide upon a partial displacement of said pins by said card to cause the movement of said slide relative to said structure.

WILLIAM W. LASKER, Jr.

REFERENCES CITED

The following references are of record in the file of this patent:

UNITED STATES PATENTS

| Number | Name | Date |
| --- | --- | --- |
| 1,534,595 | Lasker | Apr. 21, 1925 |
| 2,323,816 | Lasket et al. | July 6, 1943 |
| 2,345,289 | Rieber | Mar. 28, 1944 |